UNITED STATES PATENT OFFICE.

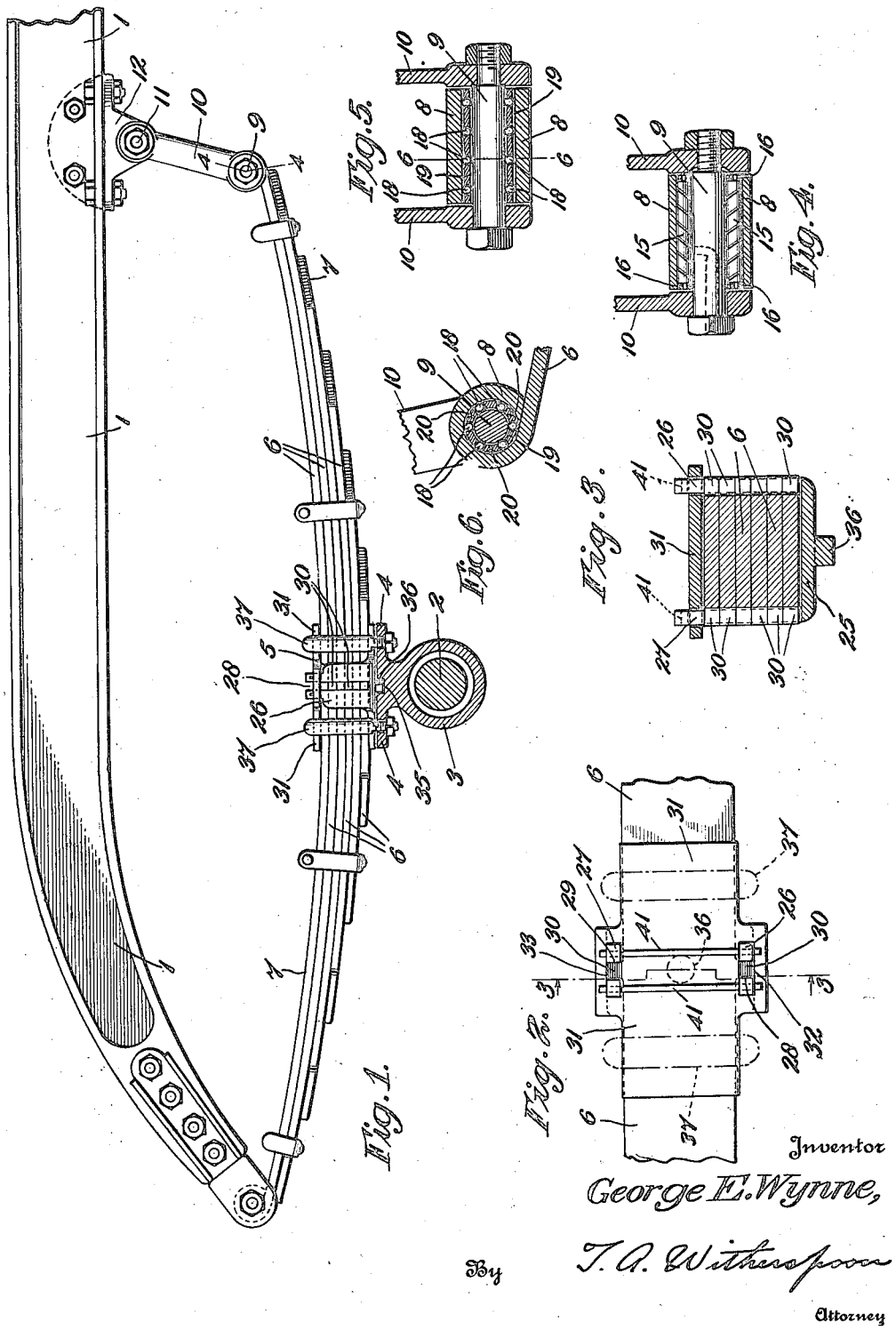

GEORGE E. WYNNE, OF LENOIR, NORTH CAROLINA, ASSIGNOR OF TWENTY PER CENT TO W. B. LINDSAY AND TWENTY PER CENT TO W. L. LENOIR, BOTH OF LENOIR, NORTH CAROLINA.

VEHICLE SPRING AND CLIP THEREFOR.

1,427,144.   Specification of Letters Patent.   Patented Aug. 29, 1922.

Application filed February 1, 1921. Serial No. 441,661.

*To all whom it may concern:*

Be it known that I, GEORGE E. WYNNE, a citizen of the United States, residing at Lenoir, in the county of Caldwell and State of North Carolina, have invented certain new and useful Improvements in Vehicle Springs and Clips Therefor; and I do hereby declare the following to be a full, clear, and exact description of the invention, such as will enable others skilled in the art to which it appertains to make and use the same.

This invention relates to vehicle springs and clips therefor, and has for its object to provide a device of this character which will be simple in construction, comparatively inexpensive to manufacture, and more efficient in action than those heretofore proposed.

With these and other objects in view the invention consists in the novel details of construction and combinations of parts more fully hereinafter disclosed and particularly pointed out in the claims.

Referring to the accompanying drawings forming a part of this specification in which like numerals designate like parts in all the views:—

Figure 1 is a diagrammatic side elevational view of a device made in accordance with the present invention, showing it applied to the frame of a motor vehicle;

Figure 2 is a fragmentary plan view, on a somewhat enlarged scale, of a portion of the parts shown in Figure 1;

Figure 3 is a transverse sectional view, taken approximately on the line 3—3 of Figure 2;

Figure 4 is a detail sectional view of one of the shackle bolt bearings, taken approximately on the line 4—4 on Figure 1;

Figure 5 is a view similar to Figure 4 of a somewhat modified form of bearing; and Figure 6 is a transverse sectional view taken approximately on the line 6—6 of Figure 5.

1 indicates a portion of the customary frame of a motor or other vehicle, having the axle 2, mounted in the housing or casing 3, provided with the ears or extensions 4. Seated upon the said housing 3 and secured thereto is the spring clip 5 adapted to receive and hold the leaves 6 of the spring 7, as will be clear from Figure 1. The ends of the uppermost leaf of the said spring are bent in the usual manner to form eyes such as 8, Figures 4, 5 and 6, adapted to receive the shackle bolts 9. 10 designates the usual shackles connecting one end of the spring to the frame 1 through the medium of the bolts 11 and brackets 12.

In automobile spring shackles as at present employed it is customary to place a suitable sleeve or bushing in the eyes such as 8 of the ends of the springs 7, and of the brackets 12, which bushings form a bearing for the shackle bolts such as 9 and 11. Although provision is made for the lubrication of these bearings, it is found that in actual practice these bushings wear rapidly, causing lost motion, side sway, and undesirable rattling, which can only be overcome by the replacement of the bushings. This is a more or less expensive proceeding, where it must be gone through frequently, and more especially with the larger cars, and I propose to avoid it to a great extent by employing a suitable ball, roller, or other anti-friction bearing around the shackle bolts 9 and 11.

To this end I have illustrated in Figure 4 a standard roller bearing comprising the rollers 15 journalled in the bearing rings 16, and providing an anti-friction bearing between the eye 8 and the bolt 9. When standard bearings of this type are employed I have usually found it necessary to either increase the diameter of the hole in the eye by grinding or boring it out, or to decrease the diameter of the standard bolt 9, for the standard bearings of this character are not of a size applicable to the present needs. For this reason I prefer to provide a special bearing such as is shown in Figures 5 and 6, comprising a plurality of rows or sets of balls 18 of a diameter equal to the thickness of the bushing usually employed, said set of balls being preferably suitably spaced and permanently held in a retaining sleeve 19. Said sleeve 19 is of a thickness somewhat less than the diameter of the balls 18, so that the latter may at all times engage the surface of the bolt such as 9 and the inner periphery of the eye 8, thereby providing an anti-friction bearing between the said bolt and eye. The retaining ring 19 may be provided with suitable longitudinal and radial oil grooves 20 to provide for the necessary lubrication.

It will be noted that in using a bearing of either of the types disclosed no special races or bearing surfaces need be provided, since the eye such as 8 is of tempered spring steel, while the bolts such as 9 are usually hardened and ground by the manufacturer thereof.

The clip 5, which secures the spring 7 to the axle housing 3, comprises a base or bottom plate 25 provided with the rigid side members 26 and 27 substantially at right angles to the said bottom plate. The said side members are slotted as at 28 and 29 respectively for substantially their full length to accommodate the lugs 30 with which the center portion of each of the spring leaves 6 is provided.

These said lugs may be integrally formed upon the leaves in the course of manufacture by stamping or offsetting in any suitable manner, or they may consist of separate pieces welded to the body of the leaves, as desired.

31 indicates a top plate or securing member of substantially the same outline as the base plate 25, and provided with a pair of apertures 32 and 33 to accommodate the upper reduced ends of the side members 26 and 27, as will be clear from Figures 1, 2 and 3 of the drawings. The axle housing 3 is recessed as at 35 to receive the lug or boss 36 with which the base plate 25 is provided, to prevent longitudinal and lateral movement of the parts, as will presently appear. The clip and spring may be secured to the axle housing 3 by the usual U-bolts 37 carrying the nuts 38, in the well known manner.

In assembling the spring leaves and clip, before they are secured to the housing 3, it is desirable that they may be temporarily rigidly held together, and to this end I have provided the upper reduced portions of the side members 26 and 27 with the laterally extending perforations 41 adapted to receive the holding pins not shown. In the assembly of the parts, the leaves may be brought into their proper relation, and the lower clip member slipped up with the lugs 30 of the leaves engaging the slots 28 and 29 of the side members 26 and 27, the top plate 31 put in place as indicated in Figures 2 and 3, whereupon the parts may be temporarily held in their proper relative positions by inserting the pins 41 in the holes 40. These said pins 41 may or may not be removed after the spring and clip have been secured to the housing 3 by the U-bolts 37.

It will be observed that by employing the present clip it is not necessary to drill or in any way perforate or weaken the spring leaves. In many types of leaf springs at present employed, the leaves themselves are perforated at or near their middle portions to receive a bolt, the head of which enters a recess in the axle housing 3 similar to the recess 35 here shown, to prevent longitudinal and lateral motion. Such perforation, however, has in practice been found to so weaken the leaves at the mid point as to cause a large majority of spring fractures to occur at such point.

With the present invention, on the other hand, the leaves are not weakened, but on the contrary are strengthened, while at the same time all of the advantages of the bolt held clip are retained.

It is obvious that those skilled in the art may vary the details of construction as well as the arrangement of parts without departing from the spirit of the invention, and therefore, I do not wish to be limited to the above disclosure except as may be required by the claims.

What I claim is:—

1. In a vehicle spring the combination of a plurality of spring leaves each provided with a laterally extending lug rigid therewith and of the same thickness as its corresponding leaf; a clip member having a base plate and a plurality of angularly disposed side members each provided with a slot extending entirely through the same and adapted to accommodate said lugs; a top plate adapted to engage said side members; and means comprising a hollow housing to secure all of said members to the vehicle axle, substantially as described.

2. In a vehicle spring the combination of a plurality of spring leaves each provided with a laterally extending lug rigid therewith; a clip member having a base plate provided with a depending boss and a plurality of angularly disposed side members each provided with a reduced upper portion and with a slot adapted to accommodate said lugs; a perforated top plate adapted to engage said side members; and means provided with a recess to receive said boss and comprising U-bolts and a hollow housing adapted to secure all of said members to the vehicle axle, substantially as described.

3. A vehicle spring clip comprising a base member provided with a depending boss and with rigid angularly disposed side members each of which is provided with a slot and with a perforation; a top plate member adapted to engage said side members; and means adapted to coact with said perforations and said top member to temporarily hold all of said members in place upon a spring, substantially as described.

4. A vehicle spring clip comprising a base member provided with a depending boss and with rigid angularly disposed side members each of which is provided with a reduced upper portion, a slot and with a perforation; a perforated top plate member adapted to engage said side members; and means comprising pins adapted to coact with said perforations and said top member to temporarily hold all of said members in place upon a spring, substantially as described.

5. In a vehicle spring the combination of a plurality of spring leaves each provided with a laterally extending lug rigid therewith and of the same thickness as its corresponding leaf; a clip member having a securing plate and a plurality of angularly disposed side members each provided with a slot extending entirely through the same and adapted to accommodate said lugs; a plate adapted to engage said side members; and means for fastening said plate and side members together.

In testimony whereof I affix my signature

GEO. E. WYNNE.